(12) United States Patent
Xu (10) Patent No.: US 12,218,600 B2
(45) Date of Patent: Feb. 4, 2025

(54) FLYBACK CONVERTER AND POWER SUPPLY SYSTEM WITH DYNAMIC UNDER VOLTAGE PROTECTION

(71) Applicant: Joulwatt Technology Co., Ltd., Hangzhou (CN)

(72) Inventor: Xiangyong Xu, Hangzhou (CN)

(73) Assignee: JOULWATT TECHNOLOGY CO., LTD., Hangzhou (CN)

( * ) Notice: Subject to any disclaimer, the term of this patent is extended or adjusted under 35 U.S.C. 154(b) by 230 days.

(21) Appl. No.: 17/993,953

(22) Filed: Nov. 24, 2022

(65) Prior Publication Data

US 2023/0198415 A1   Jun. 22, 2023

(30) Foreign Application Priority Data

Dec. 20, 2021   (CN) .......................... 202111560223.X (51) Int. Cl.
*H02M 3/335* (2006.01)
*H02M 1/32* (2007.01)
(Continued)

(52) U.S. Cl.
CPC .......... *H02M 3/33571* (2021.05); *H02M 1/32* (2013.01); *H02M 1/36* (2013.01); *H02M 1/4208* (2013.01)

(58) Field of Classification Search
CPC ............ H02M 3/22; H02M 1/08; H02M 1/36; H02M 3/24; H02M 3/325; H02M 3/335; H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553;
(Continued)

(56) References Cited

U.S. PATENT DOCUMENTS 7,568,117 B1 * 7/2009 Fernald ................. H02M 3/156
                                                       363/21.01
10,224,823 B2 * 3/2019 Chen ....................... H02M 1/32
(Continued)

FOREIGN PATENT DOCUMENTS

CN      103066851 B     4/2013
CN      111277129 A     6/2020

*Primary Examiner* — Jeffrey A Gblende
(74) *Attorney, Agent, or Firm* — Treasure IP Group, LLC (57) ABSTRACT

The present disclosure relates to a flyback converter and a power supply system. The flyback converter comprises: a transformer; a first switching transistor and a second switching transistor; a first inductor and a first capacitor; and a control circuit. The control circuit includes an under voltage protection module configured to determine an under voltage protection threshold proportional to an output voltage of the flyback converter and to trigger an under voltage protection action of the flyback converter in a case that an input voltage of the flyback converter is less than the under voltage protection threshold. By setting an adaptive under voltage protection threshold, a system-restart phenomenon of the flyback converter after an input power failure or a shutdown may be avoided, and a PFC circuit may be turned off to optimize the standby power consumption and the low load efficiency in fast charging applications using an flyback topology.

14 Claims, 6 Drawing Sheets

(51) Int. Cl.
*H02M 1/36* (2007.01)
*H02M 1/42* (2007.01)

(58) Field of Classification Search
CPC ......... H02M 3/33523; H02M 3/33561; H02M 3/155; H02M 3/1582; H02M 1/4233; H02M 1/12; H02M 3/07; H02M 7/219; H02M 7/4815; H02M 1/0048; H02M 7/4818; H02M 7/4826; H02M 7/4833; Y02B 70/1491
See application file for complete search history.

(56) References Cited

U.S. PATENT DOCUMENTS

| | | | |
|---|---|---|---|
| 10,312,816 B1* | 6/2019 | Zhao | H02M 3/156 |
| 10,375,780 B2* | 8/2019 | Ye | H02M 3/33507 |
| 11,522,441 B2* | 12/2022 | Picard | H02M 1/322 |
| 2015/0198634 A1* | 7/2015 | Brinlee | G01R 31/28 |
| | | | 324/72.5 |

* cited by examiner

FIG.1a

PRIOR ART

FIG.1b

PRIOR ART

FIG.2

PRIOR ART

FLYBACK CONVERTER AND POWER SUPPLY SYSTEM WITH DYNAMIC UNDER VOLTAGE PROTECTION

CROSS-REFERENCE TO RELATED APPLICATIONS

The present application claims priority to a Chinese patent application filed on Dec. 20, 2021 with application Ser. No. 20/211,1560223.X, and entitled "FLYBACK CONVERTER AND POWER SUPPLY SYSTEM", the disclosure of which is herein incorporated by reference in its entirety, including specification, claims, attached drawings and abstract.

FIELD OF THE DISCLOSURE

The present disclosure relates to the technical field of switching power supply, in particular to a flyback converter and a power supply system.

DESCRIPTION OF THE RELATED ART

A flyback converter is one of switching power supplies, and is widely used in the design of a low-power switching power supply, such as mobile phone charger, LED driver and so on. A conventional switching power supply system provides an output current with a single-stage or multi-stage driver. Among them, a single-stage system typically consists of a DC/DC converter. A multi-stage system consists of a power factor correction (PFC) circuit and a DC/DC converter, for example. The PFC circuit generally is a BOOST topology and is used as a front stage to provide a stable output voltage as an input of a back stage, while the DC/DC converter is used as the back stage to convert the output voltage provided by PFC circuit into the required DC voltage. Taking a mobile phone charger, a PD fast charging system needs a PFC circuit for an input power above a certain value, such as 75 W.

A single-transistor flyback converter is usually used as a back stage of the PFC circuit to realize a wide-range input and a wide-range output. Because of the advantages of the wide-range input and the wide-range output of the single-transistor flyback converter, the PFC circuit can be turned off in a standby state at an output voltage of 5V or in a low load state, so as to optimize standby power consumption or low load efficiency. An asymmetric half bridge flyback (AHB) converter has more efficiency than a single-transistor flyback converter, but has an output/input gain range lower than that of the single-transistor flyback converter. For a system of optimized design, the asymmetric half-bridge flyback converter can only have a wide output range, but not a wide input range at the same time.

In order to optimize the standby power consumption or low load efficiency of the asymmetric half-bridge flyback converter, it is necessary to turn off the PFC circuit in a standby state at an output voltage of 5V or in a low load state. However, when the PFC circuit is turned off, the input voltage of the asymmetric half-bridge flyback converter is relatively low at a low voltage input (such as an AC voltage of 90V). Therefore, it is necessary to set a brown-in threshold voltage (i.e. an operating voltage threshold for starting to work when an input voltage reaches) and a brown-out threshold voltage (i.e. an under voltage protection threshold) of the asymmetric half-bridge flyback converter to be relatively low. For example, the operating voltage threshold is set to be below 90V, such as 80V, and the under voltage protection threshold is set to be 70V, so that the asymmetric half-bridge flyback converter can still work normally at a low voltage input when the PFC circuit is turned off.

If the operating voltage threshold and under voltage protection threshold of the asymmetric half-bridge flyback converter are set to be too low, there will have the following problems. When the input of the flyback converter is turned off at a high output voltage, due to the asymmetric half-bridge flyback converter has a gain range not as good as that of the single-transistor flyback converter, the out voltage of the asymmetric half-bridge flyback converter begins to drop before the input voltage falls to the undervoltage protection threshold. An output undervoltage protection action of a protocol chip, or an over load protection (OLP) action of a control circuit of the asymmetric half-bridge flyback converter, will be triggered. The control circuit or protocol chip of asymmetric half-bridge flyback converter will try to restart the system after the protection action is triggered for a certain time. Because the input voltage of asymmetric half-bridge flyback converter has not dropped to the under voltage protection threshold. In such a case, an output voltage of the converter will be reestablished, which does not meet the requirements of system control.

Therefore, it is necessary to provide an improved technical scheme to overcome the above technical problems in the prior art.

SUMMARY OF THE DISCLOSURE

In order to solve the above technical problems, the present disclosure provides a flyback converter and a power supply system. With a dynamic under voltage protection threshold, a system-restart phenomenon of an asymmetric half-bridge flyback converter can be avoided after the input power failure or shutdown. Thus, standby power consumption and low load efficiency can be optimized by turning off a PFC circuit in fast charging application of an asymmetric half-bridge flyback topology, with a simplified configuration.

According to a first aspect of the present disclosure, there is provided a flyback converter comprising: a transformer having a primary winding, a secondary winding, and an auxiliary winding;

a first switching transistor and a second switching transistor which are electrically coupled in series between an input terminal and a reference ground;

a first inductor and a first capacitor which are electrically coupled with the primary winding and with the second switching transistor to form a resonant loop;

a control circuit for controlling switching states of the first switching transistor and the second switching transistor, wherein the control circuit includes an under voltage protection module, the under voltage protection module is configured to determine an under voltage protection threshold proportional to an output voltage of the flyback converter and to trigger an under voltage protection action of the flyback converter in a case that an input voltage of the flyback converter is less than the under voltage protection threshold.

Preferably, the under voltage protection threshold is proportional to an output voltage of the flyback converter.

Preferably, the under voltage protection module determines a duty cycle threshold in accordance with the under voltage protection threshold, and triggers the under voltage protection action in accordance with a comparison of an operating duty cycle of the flyback converter with the duty cycle threshold.

Preferably, the input voltage is less than the under voltage protection threshold when the operating duty cycle of the flyback converter is greater than the duty cycle threshold.

Preferably, the duty cycle threshold is a ratio of the output voltage of the flyback converter to the under voltage protection threshold.

Preferably, the duty cycle threshold is less than a maximum operating duty cycle of the flyback converter.

Preferably, the under voltage protection action is triggered in a case that the operating duty cycle of the flyback converter is greater than the duty cycle threshold for a period of time or when the operating duty cycle is greater than the duty cycle threshold for consecutive N times, where N is an integer greater than 1.

Preferably, the under voltage protection module is configured to sample a predetermined parameter of the flyback converter to obtain an input voltage of the flyback converter and an under voltage protection threshold, and to trigger under voltage protection action of the flyback converter in a case that the input voltage is less than the under voltage protection threshold.

Preferably, the under voltage protection module comprises:

a sample-and-hold unit configured to sample and hold a predetermined parameter of the flyback converter in an on state of the first switching transistor and to output a first sampled signal according to a sampling result;

a first sampling unit configured to sample a predetermined parameter of the flyback converter in an on state of the second switching transistor and to output a second sampled signal according to a sampling result;

a processing unit configured to receive the first sampled signal and the second sampled signal and to process the first sampled signal and the second sampled signal to obtain the input voltage and the under voltage protection threshold, and the processing unit triggers the under voltage protection action of the flyback converter in a case that the input voltage is less than the under voltage protection threshold.

Preferably, the processing unit is configured to add an absolute value of the first sampled signal and an absolute value of the second sampled signal to obtain a first voltage characterizing the input voltage;

and to multiply an absolute value of the second sampled signal and a first predetermined coefficient to obtain a second voltage characterizing the under voltage protection threshold.

Preferably, the processing unit is configured to subtract an absolute value of a product of the second sampled signal and a second predetermined coefficient from an absolute value of the first sampled signal to obtain a third voltage containing information characterizing the input voltage and the under voltage protection threshold, the processing unit is further configured to compare the third voltage with a zero voltage and to trigger an under voltage protection action of the flyback converter in a case that the third voltage is less than the zero voltage.

Preferably, the processing unit is configured to compare an absolute value of the first sampled signal and an absolute value of a product of the second sampled signal and a third predetermined coefficient, and to trigger the under-voltage protection action of the flyback converter in a case that an absolute value of the first sampled signal is less than an absolute value of a product of the second sampled signal and the third predetermined coefficient.

Preferably, the transformer includes a primary winding, a secondary winding, and an auxiliary winding, and the predetermined parameter is a voltage across any winding of the transformer; or the predetermined parameter is a current flowing through a voltage detection pin of the control circuit.

Preferably, the flyback converter further comprises:

a startup module for starting the control circuit when the input voltage is detected to be higher than a predetermined operating voltage threshold.

Preferably, the startup module includes:

a third resistor connected in parallel with the first capacitor;

a comparison unit configured to compare the input voltage with a predetermined operating voltage threshold and to activate the control circuit in a case that the input voltage is greater than the predetermined operating voltage threshold.

Preferably, the predetermined parameter is a divided voltage of the voltage across the auxiliary winding, and the flyback converter further comprises:

a first resistor and a second resistor which are electrically coupled in series between a first terminal and a second terminal of the auxiliary winding, and an intermediate node of the first resistor and the second resistor is electrically coupled to a voltage detection pin of the control circuit.

Preferably, the predetermined parameter is a current flowing through a voltage detection pin of a control circuit of the flyback converter, and the flyback converter further comprises:

a fourth resistor connected between a voltage detection pin of the control circuit and a first terminal of an auxiliary winding in the transformer, and a second terminal of the auxiliary winding is connected with a reference ground;

a third switching transistor connected between a voltage detection pin of the control circuit and a reference ground;

a control unit connected to a control terminal of the third switching transistor for turning on the third switching transistor in on states of the first switching transistor and the second switching transistor.

According to a second aspect of the present disclosure, there is provided a power supply system comprising a rectifier circuit for rectifying an input voltage from an AC power supply;

a power factor correction circuit being electrically coupled with the rectifier circuit for correcting the power factor of an output voltage of the rectifier circuit and outputting a second voltage; and a flyback converter as described above, which outputs a predetermined DC voltage in accordance with the output voltage of the power factor correction circuit.

The beneficial effects of the present disclosure include at least:

An under voltage protection module in a flyback converter according to an embodiment of the present disclosure determines an under voltage protection threshold proportional to an output voltage of the flyback converter, which effectively avoids the phenomenon of the output restart of the flyback converter (such as an asymmetric half-bridge flyback converter) after input power-down or shutdown. Thus, standby power consumption and low load efficiency can be optimized by turning off a PFC circuit in fast charging application of an asymmetric half-bridge flyback topology, with a simplified configuration.

It should be noted that the above general description and the following detailed description are only exemplary and explanatory and are not limiting to the present disclosure.

DETAILED DESCRIPTION OF EMBODIMENTS OF THE DISCLOSURE

For ease of understanding the present disclosure, a more complete description of the present disclosure will be given below with reference to the associated drawings. Preferred embodiments of the present disclosure are given in the drawings. However, the present disclosure may be implemented in different forms and is not limited to the embodiments described herein. Rather, these embodiments are provided to enable a more thorough and comprehensive understanding of the disclosure of the present disclosure.

Figure 1A:
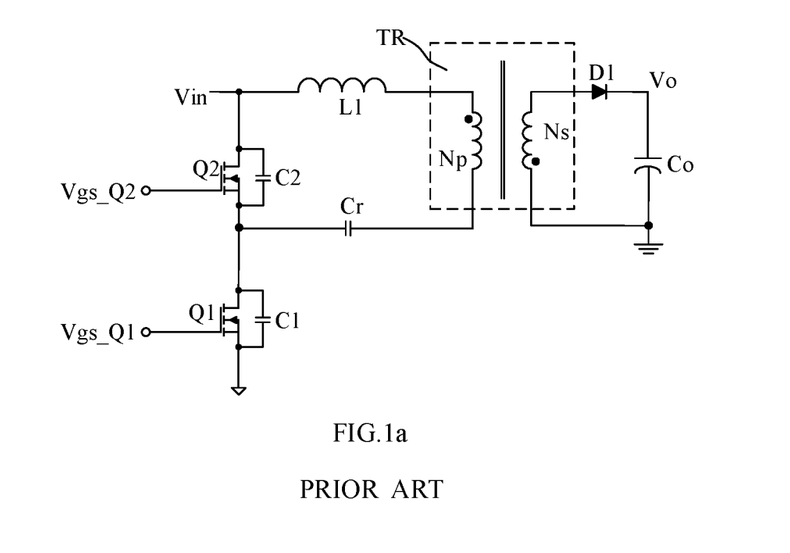
FIG. 1A shows a schematic circuit structure diagram of a conventional asymmetric half-bridge flyback converter.
Figure 1B:
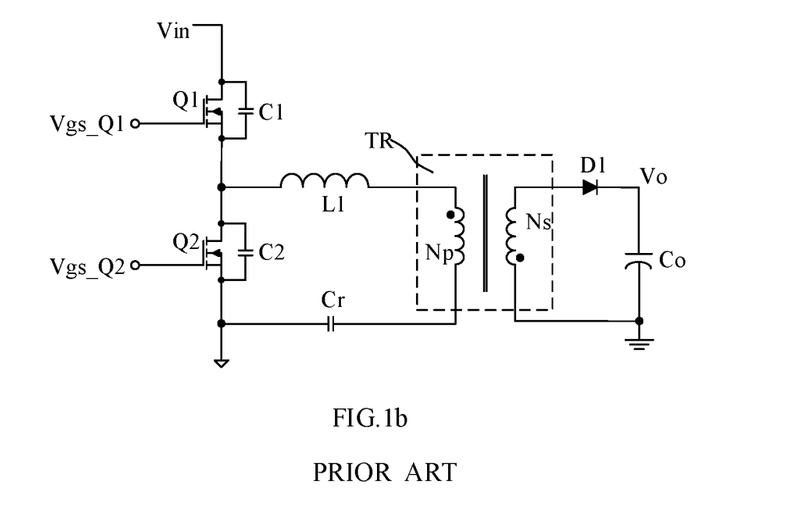
FIG. 1B shows a schematic circuit structure diagram of another conventional asymmetric half-bridge flyback converter.
Figure 2:
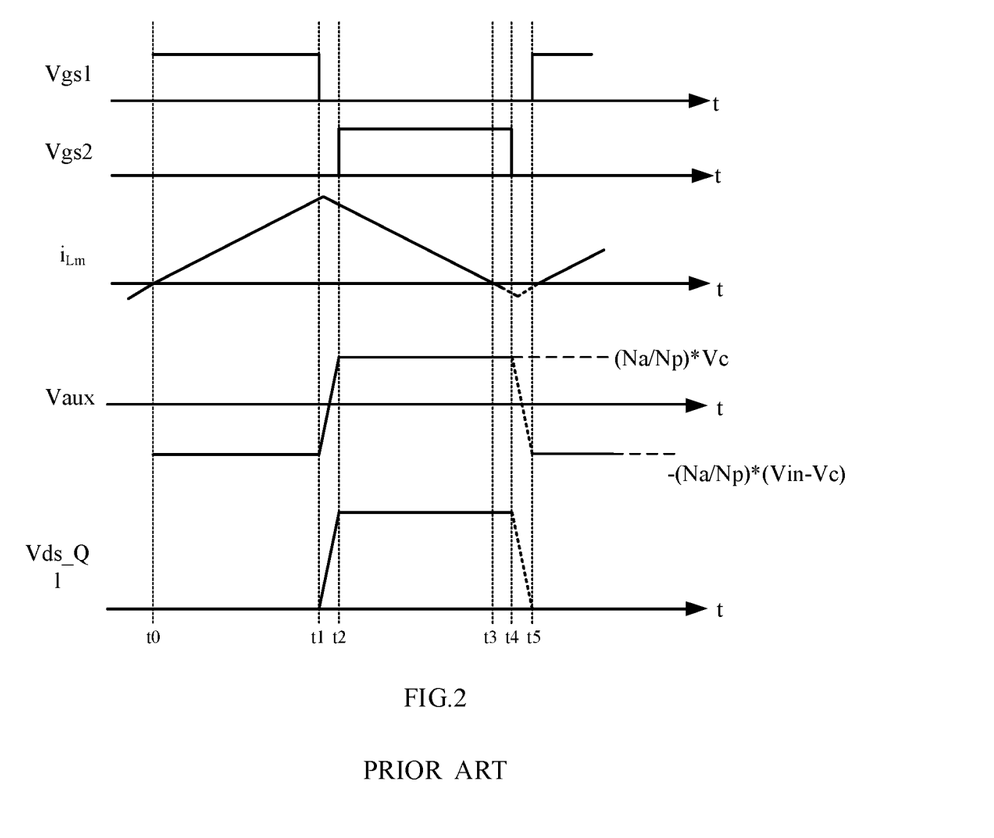
FIG. 2 shows a timing waveform diagram of the asymmetric half-bridge flyback converter shown in FIG. 1B.

FIG. 1A and FIG. 1B respectively show circuit structures of two conventional asymmetric half-bridge flyback converters, as shown in FIG. 1A and FIG. 1B, wherein an upper switching transistor Q2 is a second switching transistor and a lower switching transistor Q1 is a first switching transistor in FIG. 1A. In FIG. 1B, the upper switching transistor Q1 is the first switching transistor and the lower switching transistor Q2 is the second switching transistor. Operations of the two circuits are basically the same, except for different connections with windings. Taking FIG. 1B, an operating waveform in a critical mode (BCM mode) is shown in FIG. 2, where Vgs1 and Vgs2 represent driving signals of the first switching transistor Q1 and the second switching transistor Q2 respectively; $i_{Lm}$ represents an excitation current of a primary winding Np; Vaux represents a voltage across an auxiliary winding Na; Vds_Q1 represents a drain-source voltage of the first switching transistor.

Referring to FIG. 2, the asymmetric half-bridge flyback converter shown in FIG. 1B include the following operations.

During the period time t0-t1, the first control signal Vgs1 is at a high level, and the first switching transistor Q1 is turned on. During this period, the transformer TR is excited with energy of the input voltage Vin, through the loop of the first switching transistor Q1, the excitation inductor Lm, the primary winding Np and the first capacitor Cr. The excitation current $i_{Lm}$ firstly decreases linearly from negative to zero and then increases linearly. In this process, the first inductor L1, the transformer TR, and the first capacitor Cr store energy while the secondary rectifier diode D1 is turned off in inverse. At the same time, the voltage Vaux on the auxiliary winding Na is $-(Na/Np)*(Vin-Vc)$ during this time period, where Na/Np represents a turns ratio between the auxiliary winding Na and the primary winding Np in the transformer TR, and Vc represents a voltage across the first capacitor Cr.

At time t1, the first control signal Vgs1 becomes low level and the first switching transistor Q1 is turned off.

During the time period t1-t2, the first switching transistor Q1 is turned off, and the second switching transistor Q2 has not been turned on, and this time period is a dead time. During the dead time, due to the first inductor L1 and the primary winding Np being freewheeled, a junction capacitance C1 of the first switching transistor Q1, a junction capacitance C2 of the second switching transistor Q2, the first capacitance Cr, the first inductor L1 and the primary winding Np resonate. Energy of the junction capacitance C2 of the second switching transistor Q2 is extracted, so that a drain-source voltage Vds_Q2 of the second switching transistor Q2 decreases. Meanwhile, the junction capacitance C1 of the first switching transistor Q1 is charged, so that the drain-source voltage Vds_Q1 of the first switching transistor Q1 increases. At the same time, the voltage Vaux on the auxiliary winding Na rises from a negative voltage during this time period.

At time t2, the junction capacitance voltage of the first switching transistor Q1 reaches the highest level, and the junction capacitance voltage of the second switching transistor Q2 is pumped to zero voltage. Consequently, the second control signal Vgs2 becomes a high level, and the second switching transistor Q2 is turned on, so that the second switching transistor Q2 can be turned on at the zero voltage. At the same time, the voltage Vaux across the auxiliary winding Na also reaches the highest, which is $(Na/Np)*Vc$.

In the period t2-t3, the rectifier diode D1 is turned on in the secondary side of the asymmetric half-bridge flyback converter, energy stored in the primary side of the transformer TR begins to be released to the secondary side, and the excitation current iLm linearly decreases.

At time t3, this time is the initial turn-off time of the asymmetric half-bridge flyback converter, and at time t3, the excitation current $i_{Lm}$ linearly drops to near the zero current.

During the time period t3-t4, this time period is the delayed conduction time of the second switching transistor Q2, and the first inductor L1 and the first capacitor Cr resonate in this time period, and energy stored in the first capacitor Cr is also released to the secondary side through the forward excitation process, and the excitation current $i_{Lm}$ enters the negative direction.

At time t4, the second drive signal Vgs2 received by the gate of the second switching transistor Q2 becomes low and the second switching transistor Q2 is turned off.

During the t4-t5 time period, the first switching transistor Q1 and the second switching transistor Q2 are both in an off state, Because the excitation current $i_{Lm}$ freewheels, the first inductor L1 and the primary winding Np also freewheels. Therefore, the junction capacitance C1 of the first switching transistor Q1, the junction capacitance C2 of the second switching transistor Q2, the first capacitance Cr, the first inductor L1 and the primary winding Np resonate, and energy of the junction capacitance C1 of the first switching transistor Q1 is extracted, so that the drain-source voltage Vds_Q1 of the first switching transistor Q1 decreases, and the junction capacitance C2 of the second switching transistor Q2 is charged at the same time, and the drain-source voltage Vds_Q1 of the second switching transistor Q2 increases. At the same time, the voltage Vaux across the auxiliary winding Na decreases linearly.

At time t5, the voltage Vaux across the auxiliary winding Na drops to a minimum of $-(Na/Np)*(Vin-Vc)$, meanwhile, the junction capacitance voltage of the second switching transistor Q2 reaches a maximum, the junction capacitance voltage of the first switching transistor Q1 is pumped to zero voltage, and the first control signal Vgs1 becomes a high level, so that the first switching transistor Q1 is turned on at the zero voltage. This completes a cycle time, which is then repeated according to the same processes.

The asymmetric half-bridge flyback converter in a BCM mode generates a negative excitation current iun by controlling the second switch Q2 to be turned on for an extra period of time (such as tzvs), so that the first switch Q1 is turned on at the zero voltage.

Figure 3:
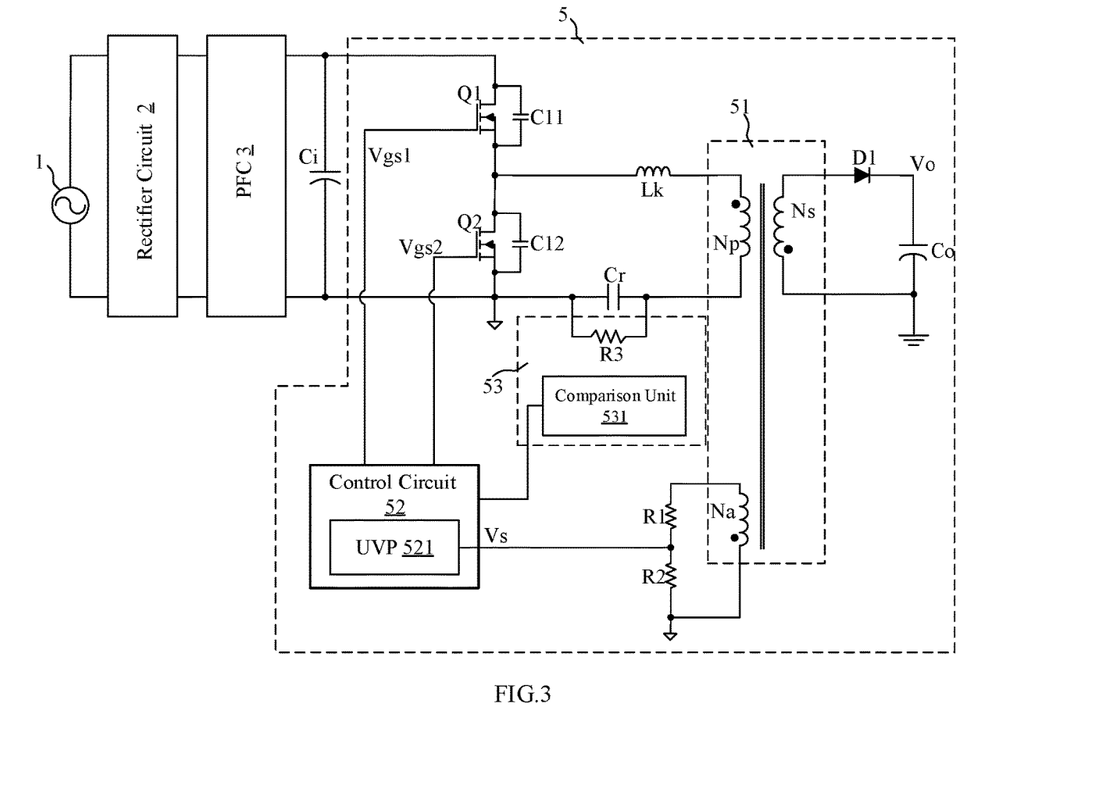
FIG. 3 shows a circuit diagram of a power supply system provided according to a first embodiment of the present disclosure.
Figure 4:
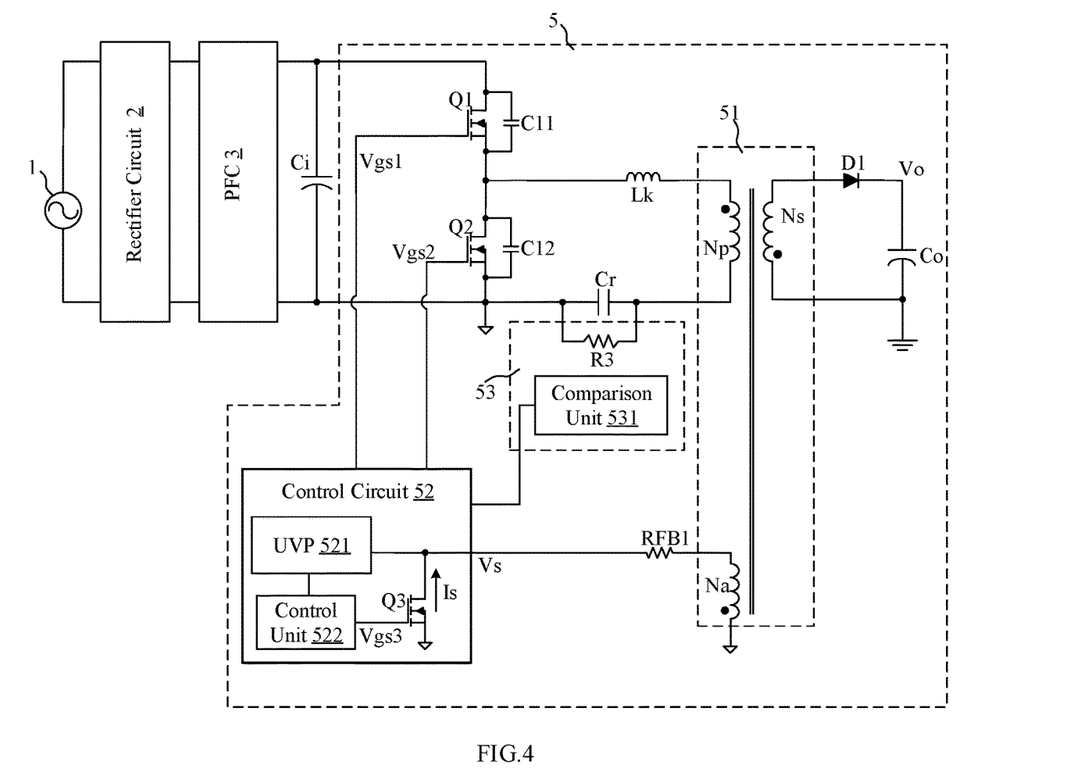
FIG. 4 shows a circuit diagram of a power supply system provided according to a second embodiment of the present disclosure.

As shown in FIGS. 3 and 4, the power supply system according to an embodiment of the present disclosure includes an AC power supply 1, a rectifier circuit 2, a power factor correction circuit 3 and a flyback converter 5. For example, the flyback converter 5 includes but is not limited to the asymmetric half-bridge flyback converter shown in FIG. 1A or FIG. 1B.

The rectifier circuit 2 is used for rectifying an AC input voltage from the AC power supply 1. Preferably, the rectifier circuit 2 may be a full-bridge rectifier circuit or a half-bridge rectifier circuit.

The power factor correction circuit 3 is electrically coupled to the rectifier circuit 2 and is used for correcting the power factor of an output voltage from the rectifier circuit 2. The power factor correction circuit 3 generally is a BOOST topology, and is used as a front stage to provide a stable corrected voltage (e.g. 400V) as an input to a back stage circuit such as the flyback converter 5, in accordance with the rectified voltage.

The flyback converter 5 outputs a predetermined DC voltage to drive a back stage load, in accordance with an output voltage of the power factor correction circuit 3.

In the embodiment according to the present disclosure, the flyback converter 5 is, for example, an asymmetric half-bridge flyback converter, which includes a transformer 51, a first switching transistor Q1 and a second switching transistor Q2 which are connected in series between an input terminal and a reference ground and formed a half-bridge, a first inductor Lk, a first capacitor Cr, and a control circuit 52. The transformer 51 includes a primary winding Np, a secondary winding Ns, and an auxiliary winding Na.

A drain of the first switching transistor Q1 is electrically coupled to the input terminal to receive a second voltage, which is the input voltage of the flyback converter 5 and referred to herein as Vin, and a gate of the first switching transistor Q1 is electrically coupled to the control circuit 52; A drain electrode of the second switching transistor Q2 is electrically coupled to a source electrode of the first switching transistor Q1, a source electrode of the second switching transistor Q2 is electrically coupled to the reference ground, a gate electrode of the second switching transistor Q2 is electrically coupled to the control circuit 52. The capacitors C11 and C12 are junction capacitors of the first switching transistor Q1 and the second switching transistor Q2 respectively. During the same switching period, the first switching transistor Q1 and the second switching transistor Q2 are turned on and off alternately to transfer the input voltage Vin from the primary side portion to the secondary side portion of the transformer 51. In an alternative embodiment, both the first switch transistor Q1 and the second switch transistor Q2 are NMOS field effect transistors.

The first inductor Lk, the primary winding Np, the first capacitor Cr and the second switching transistor Q2 form a resonant circuit. In this embodiment, the first inductor Lk is connected between the drain of the second switching transistor Q2 and the first terminal of the primary winding Np, and the first capacitor Cr is connected between the source of the second switching transistor Q2 and the second terminal of the primary winding Np. In alternative embodiment, the first inductor Lk is leakage inductance of the primary winding Np and the first capacitor Cr is the resonant capacitor.

The secondary side portion of the flyback converter 5 includes a rectifier diode D1 and an output capacitor Co. In this embodiment, an anode of the rectifier diode D1 is electrically coupled to a negative terminal of the secondary winding Ns, and a cathode of the rectifier diode D1 is electrically coupled to an output terminal of the flyback converter 5. A positive terminal of the output capacitor Co is electrically coupled to an output terminal of the flyback converter 5, a negative terminal of the output capacitor Co is electrically coupled to the reference ground, and a positive terminal of the secondary winding Ns is also connected to the reference ground. Further, the output terminal of the flyback converter 5 is electrically coupled to a load which receives electric energy (e.g. voltage and current) from the flyback converter 5. In some examples, the power converted by the flyback converter 5 is further filtered before reaching the load. In some examples, a filter may be a part of the flyback converter 5, an external component of the flyback converter 5, and/or a part of the load. In any case, the load may perform its functions with filtered or unfiltered power from the flyback converter 5. Optionally, the load may include, but is not limited to, computing devices and related components, such as microprocessors, electrical components, circuitry, laptop computers, desktop computers, tablet computers, mobile phones, batteries, speakers, lighting units such as LED, automobile/ship/aviation/train related components, motors, transformers, or any other type of electrical equipment and/or circuitry that receives voltage or current from the flyback converter.

The control circuit 52 is configured to generate a first control signal Vgs1 and a second control signal Vgs2 to control on and off states of the first switching transistor Q1 and the second switching transistor Q2 respectively.

Further, the control circuit 52 includes an under voltage protection module 521. The under voltage protection module 521 is configured to sample a predetermined parameter of the flyback converter to obtain an input voltage of the flyback converter and an under voltage protection threshold proportional to an output voltage Vo of the flyback converter, and to trigger an under voltage protection action of the flyback converter in a case that the input voltage is less than the under voltage protection threshold. Preferably, the under voltage protection threshold is proportional to an output voltage Vo of the flyback converter.

Figure 5:
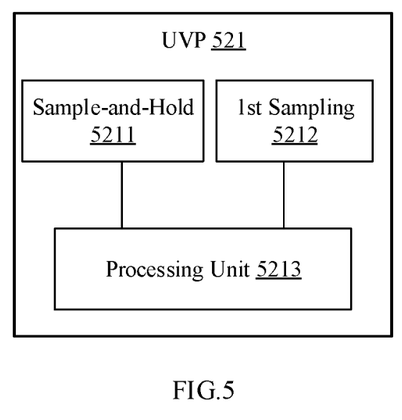
FIG. 5 shows a schematic diagram of an internal structure of the under voltage protection module in FIGS. 3 and 4.

Referring to FIG. 5 the under voltage protection module 521 further includes a sample-and-hold unit 5211, a first sampling unit 5212 and a processing unit 5213. The sample-and-hold unit 5211 is configured to sample and hold a predetermined parameter of the flyback converter while the first switching transistor Q1 is turned on, and outputs a first sample signal in accordance with the sampling result. The first sampling unit 5212 is configured to sample a predetermined parameter of the flyback converter in an on state of the second switching transistor Q2 and output a second sampled signal in accordance with the sampling result. The processing unit 5213 is electrically coupled to the sample-and-hold unit 5211 and the first sampling unit 5212, respectively. The processing unit 5213 is configured to receive the first sampled signal and the second sampled signal, and to process the first sample signal and the second sample signal to obtain an input voltage and an under voltage protection threshold of the flyback converter. The processing unit 5213 is further configured to trigger an under voltage protection action of the flyback converter in a case that the input voltage of the flyback converter is less than the under voltage protection threshold.

It should be understood that the under voltage protection threshold obtained according to an embodiment of the present disclosure varies in proportion to the output voltage Vo of the flyback converter 5 (i.e. the higher the output voltage, the higher the under voltage protection threshold). Even in a case that an output voltage of the asymmetric half-bridge flyback converter triggers an output under voltage protection (UVP) action of the protocol chip or an overload protection action of the control circuit 52 at a high output voltage of the asymmetric half-bridge flyback converter 5, an input voltage of flyback converter can trigger an input under voltage protection in time to meet the system requirements. It will effectively avoid the phenomenon that the asymmetric half-bridge flyback converter 5 is restarted after the input is powered down or shut down. Thus, the standby power consumption and low load efficiency of the system can be optimized by shutting down the PFC circuit 3 in a fast charging application including the asymmetric half-bridge flyback topology, such as the power supply system shown in FIG. 3 or FIG. 4.

Based on the operating principle of the transformer 51, a voltage across the primary winding Np, a voltage across the secondary winding Ns, and a voltage Vaux across the auxiliary winding Na all have a certain proportional relationship with each other. Further, if a voltage detection pin Vs of the control circuit 52 in the flyback converter 5 can withstand a negative voltage, the predetermined parameter of the flyback converter 5 is the voltage across any winding of the transformer 51 in some cases. The first sampled signal is a voltage sampled in an on state of the first switch Q1 and the second sampled signal is a voltage sampled in an on state of the second switch Q2. Preferably, it may be the voltage Vaux across the auxiliary winding Na. As an example, the predetermined parameter may be the voltage Vaux across the auxiliary winding Na, the voltage detection pin Vs of the control circuit 52 may be directly connected to one terminal of the auxiliary winding Na, while the other terminal of the auxiliary winding Na is electrically coupled to the reference ground.

Alternatively, the predetermined parameter of the symmetrical half-bridge flyback converter 5 is a divided voltage of a voltage across any winding of the transformer TR. For example, the predetermined parameter may be a divided voltage of the voltage Vaux across the auxiliary winding Na. In this case, referring to FIG. 3, the flyback converter 5 further includes a first resistor R1 and a second resistor R2. The first resistor R1 and the second resistor R2 are sequentially connected in series between a negative terminal and a positive terminal of the auxiliary winding Na, and an intermediate node of the first resistor R1 and the second resistor R2 is electrically coupled to the voltage detection pin Vs of the control circuit 52.

Alternatively, in this embodiment, the voltage Vaux across the auxiliary winding Na can be sampled by the voltage detection pin Vs of the control circuit 52 after being divided by the first resistor R1 and the second resistor R2. In addition, the control circuit 52 can directly sample the voltage across the auxiliary winding Na.

Referring to FIG. 2, in an on state of the first switching transistor Q1, the voltage across the auxiliary winding Na is:

$$Vaux1=-(Na/Np)*(Vin-Vc) \quad (1),$$

where Vaux1 represents the first sampled signal, Na/Np represents the coil turns ratio between the auxiliary winding and the primary winding in the transformer 51, Vin represents an input voltage, and Vc represents a voltage across the first capacitor Cr.

In a on state of the second switching transistor Q2, the voltage across the auxiliary winding Na is:

$$Vaux2=(Na/Np)*Vc \quad (2),$$

where Vaux2 represents a second sampled signal.

In view of the operations of flyback converter, $$Vc=(Np/Ns)*Vo \quad (3),$$

where Np/Ns represents the coil turns ratio of the primary winding and the secondary winding of the transformer 51, and Vo represents an output voltage.

The procedure in which the processing unit 5213 obtains an input voltage and an under voltage protection threshold by arithmetic processing of the first sampled signal and the second sampled signal will be described in detail below in connection with the above formulas (1), (2) and (3).

For example, in the first embodiment of the present disclosure, the processing unit 5213 is configured to add an absolute value of the first sampled signal and an absolute value of the second sampled signal to obtain a first voltage (denoted V1) representing an input voltage of the flyback converter 5. Specifically, the formula (1) and the formula (2) are added to obtain:

$$V1=|Vaux1|+|Vaux2|=(Na/Np)*Vin \quad (4).$$

As can be seen from formula (4), a first voltage V1 is proportional to the input voltage Vin of the flyback converter 5. The first voltage V1 can be used to characterize the input voltage Vin of the flyback converter 5.

In this embodiment, the processing unit 5213 is configured to multiply an absolute value of the second sampled signal and a first predetermined coefficient (denoted k1) to obtain a second voltage (denoted V2), representing an under voltage protection threshold of the flyback converter 5. Specifically, one will obtain the following formula from formula (2) and formula (3):

$$V2=k1*|Vaux2|=k1*(Np/Ns)*Vo \quad (5),$$

where k1 is greater than 0. It can be seen from formula (5) that a second voltage V2 is proportional to an output voltage Vo of the flyback converter 5 and can be used to characterize an under voltage protection threshold of the flyback converter 5 which is proportional to the output voltage Vo.

In the second embodiment of the present disclosure, the processing unit 5213 is configured to subtract an absolute value of a product of a second sampled signal and a second predetermined coefficient (denoted k2) from an absolute value of a first sampled signal, to obtain a third voltage (denoted V3) representing an input voltage Vin of the flyback converter 5 and an under voltage protection threshold. Specifically, $$V3=|Vaux1|-|k2*Vaux2|=(Na/Np)*Vin-(1+k2)*(Na/Np)*Vc \quad (6),$$

where k2 is greater than 0.

Further, in this embodiment, the processing unit 5213 is further configured to compare the third voltage V3 with a zero voltage and triggers an under voltage protection action of the flyback converter 5 in a case that the third voltage V3 is less than the zero voltage, i.e.:

$$V3<0 \qquad (7).$$

When formulas (6) and (3) are incorporated into formula (7), formula (7) can be converted to:

$$Vin<(1+k2)*Vo*(Np/Ns) \qquad (8),$$

where $(1+k2)*Vo*(Np/Ns)$ is an under voltage protection threshold of the input voltage of the flyback converter 5. From formula (8), it can be seen that in a case that the input voltage Vin of the flyback converter 5 is less than the under voltage protection threshold, the under voltage protection action of the flyback converter 5 will be triggered. It is equivalent to have a dynamic under voltage protection threshold according to an embodiment of the present disclosure.

In the third embodiment of the present disclosure, the processing unit 5213 is configured to compare an absolute value of the first sampled signal with an absolute value of a product of the second sampled signal and a third predetermined coefficient (denoted k3), and to trigger an under voltage protection action of the flyback converter in a case that the absolute value of the first sampled signal is less than an absolute value of a product of the second sampled signal and the third predetermined coefficient k3.

Further, when the first sampled signal Vaux1 and the second sampled signal Vaux2 are compared, in a case that the first sampled signal Vaux1 and the second sampled signal Vaux2 satisfy the following formula (9), an under voltage protection action of the flyback converter 5 is triggered:

$$|Vaux1|<|k3*Vaux2| \qquad (9).$$

When formulas (1), (2) and (3) are incorporated into formula (9), formula (9) can be converted to:

$$Vin<(1+k3)* Vo*(Np/Ns) \qquad (10),$$

where $(1+k3)*Vo*(Np/Ns)$ is an under voltage protection threshold of the input voltage of the flyback converter 5. From formula (10), it can be seen that in a case that the input voltage Vin of the flyback converter 5 is less than the under voltage protection threshold, the under voltage protection action of the flyback converter 5 will be triggered, and it is equivalent to set a dynamic under voltage protection threshold according to an embodiment of the present disclosure. In this embodiment, after obtaining the first sampled signal and the second sampled signal by the holding unit 5211 and the first sampling unit 5212, the under-voltage protection of the flyback converter can be realized by directly comparing the first sampled signal with the second sampling signal. The required signal processing process is simplified, the under-voltage protection action can be triggered more accurately and the cost is reduced.

In the above embodiment of the present disclosure, the under voltage protection threshold of the flyback converter 5 varies in proportion to the output voltage Vo (i.e. the higher the output voltage, the higher the under voltage protection threshold correspondingly). Thus, even in a case that the output voltage of the asymmetric half-bridge flyback converter triggers an output under voltage protection (UVP) action of the protocol chip or an overload protection action of the control circuit 52 at a high output voltage of the flyback converter 5, the input voltage of asymmetric half-bridge flyback converter can trigger an input under voltage protection in time to meet the system requirements. The phenomenon of output restart of the asymmetric half-bridge flyback converter 5 after input power-down or shutdown is effectively avoided, so that the system can optimize standby power consumption and low load efficiency by turning off the PFC circuit 3 in a fast charging application of an asymmetric half-bridge flyback topology, such as the power supply system shown in FIG. 3 or FIG. 4.

As can be seen from the above formula (10), a proportional coefficient between the under voltage protection threshold value of the flyback converter 5 and the output voltage Vo is $(1+k3)*(Np/Ns)$. A value of the third predetermined coefficient k3 satisfies:

$$\frac{1}{k3+1} <D\max, \qquad (11)$$

where Dmax represents a predetermined maximum operating duty cycle of the flyback converter. In a preferable embodiment according to the present disclosure, $k3=0.5\pm0.1$.

In the present disclosure, all of the values of the predetermined coefficients (k1, k2, k3) may be identical or different, or some of the values of the predetermined coefficients (k1, k2, k3) may be identical or different, as required in an actual application, which is not limited by the present disclosure.

In the fourth embodiment of the present disclosure, the under voltage protection module 521 is further configured to determine a duty cycle threshold (denoted as DUVP) according to the under voltage protection threshold, and to trigger the under voltage protection action of the flyback converter 5 according to a comparison of the operating duty cycle (denoted as D) of the flyback converter 5 with the duty cycle threshold DUVP. In a case that the duty cycle D of the flyback converter 5 is greater than the duty cycle threshold DUVP, the input voltage Vin is less than the under voltage protection threshold.

Figure 6:
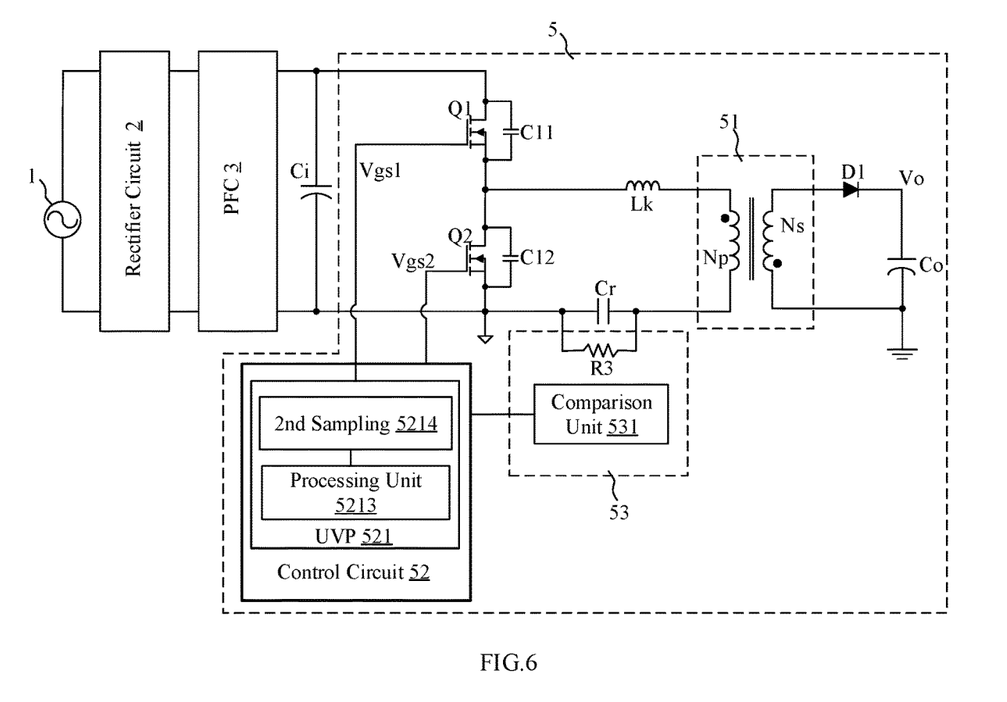
FIG. 6 shows a schematic circuit diagram of a power supply system provided according to a fourth embodiment of the present disclosure.

Specifically, as shown in FIG. 6, the under voltage protection module 521 includes a second sampling unit 5214 and a processing unit 5213. The second sampling unit 5214 is configured to sample a control signal Vgs1 of a main switching transistor of the flyback converter 5, i.e. the switching transistor which is not connected in a resonant circuit (for example, the first switching transistor Q1 in FIGs. 1a, 1b, 3 and 4), to obtain a duty cycle of the control signal Vgs1 of the main switching transistor Q1, i.e. an operating duty cycle D of the flyback converter 5. For example, the second sampling unit 5214 may obtain the operating duty cycle of the flyback converter 5 by counting the number of rising edges of the control signal Vgs1 within a predetermined time to obtain a cycle duration of the control signal Vgs1 and by timing a high level duration of the control signal Vgs1 within one cycle. It should be noted that the second sampling unit 5214 may sample the duty cycle of the control signal Vgs1 of the main switching transistor Q1 by other conventional duty cycle sampling methods to obtain the operating duty cycle D of the flyback converter 5, which is not limited by the present disclosure.

In this embodiment, the duty cycle threshold DUVP is a ratio of the output voltage Vo of the flyback converter 5 to the under voltage protection threshold. Because the under voltage protection threshold is proportional to the output voltage Vo in the present disclosure, the ratio of the output voltage Vo to the under voltage protection threshold should be a constant having a fixed value. Furthermore, in this embodiment, the duty cycle threshold DUVP may be properly predetermined, and then the operating duty cycle D of the flyback converter 5 can be obtained by sampling, and compared with the predetermined duty cycle threshold DUVP to trigger the under voltage protection action of the flyback converter 5. The number of signals required to be sampled in the whole process is reduced, and the processing method is simplified.

For example, the aforementioned formula (10) can be converted to:

$$\frac{(Np/Ns)*Vo}{Vin} > \frac{1}{1+k3}, \qquad (12)$$

wherein, $$\frac{1}{1+k3} = D_{UVP}. \qquad (13)$$

As can be seen from a combination of formula (11) and formula (13), the predetermined duty cycle threshold DUVP is smaller than the maximum operating duty cycle Dmax of the flyback converter 5. For an asymmetric half-bridge flyback converter topology, there will be:

$$\frac{(Np/Ns)*Vo}{Vin} = D. \qquad (14)$$

Further, the formula (13) and the formula (14) are incorporated into the formula (12) to obtain:

$$D > D_{UVP} \qquad (15).$$

Further, the second sampling unit 5214 sends the sampled duty cycle D of the flyback converter 5 to the processing unit 5213 or other unit or module having a corresponding data comparison function. The operating duty cycle D is compared with a duty cycle threshold DUVP which is related to an under voltage protection threshold by a processing unit 5213. The under voltage protection action of the flyback converter 5 is triggered in a case that the operating duty cycle D is greater than a predetermined duty cycle threshold DUVP.

Further, the processing unit 5213 or other unit or module having a corresponding data comparison function may also be configured to trigger under-voltage protection action of the flyback converter 5 upon detection that the operating duty cycle D is greater than the duty cycle threshold DUVP for a period of time or upon N times of consecutive comparisons that the operating duty cycle D is greater than and the duty cycle threshold DUVP, where N is an integer greater than 1. With many times of comparisons, the under voltage protection action can be triggered more accurately, and the system stability is improved.

In still other embodiments, the predetermined parameter of the flyback converter 5 is a current Is flowing through a voltage detection pin Vs of the control circuit 52. This embodiment can be applied to some controller chips whose pins do not support a negative voltage. Consequently, the first sampled signal is the corresponding first current signal sampled in an on state of the first switching transistor Q1, and the second sampled signal is the corresponding second current signal sampled in an on state of the second switching transistor Q2. In such a case, referring to FIG. 4, an asymmetric half-bridge flyback converter 5 further includes a fourth resistor RFB1 a third switching transistor Q3 and a control unit 522. The fourth resistor RFB1 is connected between a voltage detection pin Vs of the control circuit 52 and a negative terminal of the auxiliary winding Na, and a positive terminal of the auxiliary winding Na is electrically coupled to the reference ground; the third switching transistor Q3 is connected between a voltage detection pin Vs of the control circuit 52 and a reference ground; the control unit 522 is electrically coupled to a control terminal of the third switching transistor Q3 for controlling the third switching transistor Q3 to turn on at on states of the first switching transistor Q1 and the second switching transistor Q2.

Alternatively, in this embodiment, the third switching transistor Q3 may be integrated in the control circuit 52 or be an independent component outside the control circuit 52, which is not limited by the present disclosure. In alternative embodiment, the third switching transistor Q3 is an NMOS field effect transistor.

Referring to FIG. 4 and the foregoing third embodiment, a first sample signal (denoted as Is1) obtained after sampling and holding in an on state period of the first switching transistor Q1 is:

$$Is1 = \frac{(Na/Np)*(Vi-Vc)}{RFB1} \qquad (16)$$

At an on state of the second switching transistor Q2, a second sampled signal (denoted as Is2) obtained after sampling is:

$$Is2 = \frac{(Na/Np)*Vc}{RFB1}, \qquad (17)$$

where Na represents a turn number of the auxiliary winding, Np represents a turn number of the primary winding, Vin represents an input voltage, Vc represents a voltage across the first capacitor Cr, and RFB1 represents a resistance value of the third resistor.

Further, when the first sampled signal Is1 and the second sampled signal Is2 are compared, if the first sampled signal Is1 and the second sampled signal Is2 satisfy the following formula (18), under voltage protection action of the flyback converter 5 is triggered:

$$|Is1|<|k4*Is2| \qquad (18).$$

When formulas (16), (17) and (3) are incorporated into formula (18), the same result as the aforementioned formula (10) can be obtained.

It should be noted that, after obtaining the first sampled signal Is1 and the second sampled signal Is2, the first sampled signal Is1 and the second sampled signal Is2 may be processed in the same or similar manner as in the first to fourth embodiments, so as to realize the under voltage protection action of the flyback converter 5, which will not be described here.

Further, the flyback converter 5 also includes a startup module 53. The startup module 53 is used for starting the control circuit 52 when it is detected that an input voltage Vin is higher than a predetermined operating voltage threshold. In this embodiment, the predetermined operating voltage threshold value is a voltage having a fixed value, and the voltage value is set to be relatively small, so that in the power supply system shown in FIG. 3 or FIG. 4, the flyback converter 5 can still operate normally without starting the power factor correction circuit 3.

The startup module 53 further includes a third resistor R3 and a comparison unit 531. The third resistor R3 is connected in parallel with the first capacitor Cr. The comparison unit 531 is configured to compare the input voltage Vin with a predetermined operating voltage threshold and to start the control circuit 52 in a case that the input voltage Vin is greater than the predetermined operating voltage threshold. In this embodiment, with the third resistor R3 being connected in parallel with the first capacitor Cr, the voltage of the first capacitor Cr can be reduced to 0V before the flyback converter 5 is started, so that the startup module 53 can detect the input voltage Vin by directly sampling the predetermined parameters of the flyback converter 5 in an on state of the first switching transistor Q1.

For example, in a practical application of the power supply system shown in FIG. 3 or 4, when the power supply system works, the power factor correction circuit 3 is not turned on at first. The predetermined operating voltage threshold of the flyback converter 5 has a relatively low value, such as 80V. When the input voltage Vin of the flyback converter 5 is greater than the predetermined operating voltage threshold, the flyback converter 5 can have an operating state without the power factor correction circuit 3 being turned on, and can output an output voltage having a relatively low value, such as 5V.

Thereafter, the power factor correction circuit 3 starts a boosting operation, the under voltage protection threshold of the flyback converter 5 may be set to be higher than the operating voltage threshold, and may be a dynamic under voltage protection threshold which varies in proportion to the output voltage. When the system is shut down, the output voltage of the flyback converter 5 starts to drop and triggers the output UVLO under voltage protection or overload protection, to discharge the power supply voltage of the system to an under voltage protection point UVLO, thereby ensuring that the system will not be restarted when the system is shut down.

To sum up, the present disclosure samples predetermined parameters of the flyback converter in on states of a first switching transistor and a second switching transistor, respectively, to obtain a first sampled signal and a second sampled signal which are both proportional to an input voltage of the flyback converter and a turns ratio of the converter. Furthermore, in the process of an under voltage comparison of the flyback converter by comparing the first sampled signal with the second sampled signal, an under voltage protection threshold being proportional to the output voltage of the flyback converter can be obtained. The present disclosure can effectively avoid the phenomenon of output restart of a flyback converter (such as an asymmetric half-bridge flyback converter) after the input power-down or shutdown, so that standby power consumption and low load efficiency can be optimized by turning off a PFC circuit in a fast charging application of an asymmetric half-bridge flyback topology, with a simplified configuration.

Finally, it should be noted that it is obvious that the above-described embodiments are only examples for the purpose of clearly illustrating the present disclosure, and are not limited to embodiments. Other variations or alterations in different forms may be made on the basis of the above description for those of ordinary skill in the art. There is no need and cannot be an exhaustive list of all embodiments here. Those obvious changes or variations on the basis of the present disclosure are still in the protection scopes of the present disclosure.

What is claimed is:

1. A flyback converter comprising:
   a transformer having a primary winding, a secondary winding and an auxiliary winding;
   a first switching transistor and a second switching transistor which are electrically coupled in series between an input terminal and a reference ground;
   a first inductor and a first capacitor which are electrically coupled with the primary winding and with the second switching transistor to form a resonant loop;
   a control circuit for controlling switching states of the first switching transistor and the second switching transistor,
   wherein the control circuit includes an under voltage protection module which is configured to determine an under voltage protection threshold proportional to an output voltage of the flyback converter, to determine a duty cycle threshold in accordance with the under voltage protection threshold, and to trigger an under voltage protection action of the flyback converter in accordance with a comparison of an operating duty cycle of the flyback converter with the duty cycle threshold, so that the under voltage protection action is triggered, in a case that an input voltage of the flyback converter is less than the under voltage protection threshold.

2. The flyback converter according to claim 1, wherein the input voltage is less than the under voltage protection threshold when the operating duty cycle of the flyback converter is greater than the duty cycle threshold.

3. The flyback converter according to claim 1, wherein the duty cycle threshold is a ratio of the output voltage of the flyback converter to the under voltage protection threshold.

4. The flyback converter according to claim 1, wherein the duty cycle threshold is less than a maximum operating duty cycle of the flyback converter.

5. The flyback converter according to claim 1, wherein the under voltage protection action is triggered in a case that the operating duty cycle of the flyback converter is greater than the duty cycle threshold for a period of time or when the operating duty cycle is greater than the duty cycle threshold for consecutive N times, where N is an integer greater than 1.

6. The flyback converter according to claim 1, wherein the under voltage protection module is configured to sample a predetermined parameter of the flyback converter to obtain an input voltage of the flyback converter and an under voltage protection threshold, and to trigger the under voltage protection action of the flyback converter in a case that the input voltage is less than the under voltage protection threshold.

7. The flyback converter according to claim 6, wherein the under voltage protection module comprises:
   a sample-and-hold unit configured to sample and hold a predetermined parameter of the flyback converter in an on state of the first switching transistor and to output a first sampled signal according to a sampling result;
   a first sampling unit configured to sample a predetermined parameter of the flyback converter in an on state of the second switching transistor and to output a second sampled signal according to a sampling result;
   a processing unit configured to receive the first sampled signal and the second sampled signal and to process the first sampled signal and the second sampled signal to obtain the input voltage and the under voltage protection threshold, and the processing unit triggers the under voltage protection action of the flyback converter in a case that the input voltage is less than the under voltage protection threshold.

8. The flyback converter according to claim 7, wherein the processing unit is configured to add an absolute value of the first sampled signal and an absolute value of the second sampled signal to obtain a first voltage characterizing the input voltage;

and to multiply an absolute value of the second sampled signal and a first predetermined coefficient to obtain a second voltage characterizing the under voltage protection threshold.

9. The flyback converter according to claim 7, wherein the processing unit is configured to subtract an absolute value of a product of the second sampled signal and a second predetermined coefficient from an absolute value of the first sampled signal to obtain a third voltage containing information characterizing the input voltage and the under voltage protection threshold, the processing unit is further configured to compare the third voltage with a zero voltage and to trigger an under voltage protection action of the flyback converter in a case that the third voltage is less than the zero voltage.

10. The flyback converter of claim 7, wherein the processing unit is configured to compare an absolute value of the first sampled signal and an absolute value of a product of the second sampled signal and a third predetermined coefficient, and to trigger the under-voltage protection action of the flyback converter in a case that an absolute value of the first sampled signal is less than an absolute value of a product of the second sampled signal and the third predetermined coefficient.

11. The flyback converter according to claim 6, wherein the transformer comprises a primary winding, a secondary winding, and an auxiliary winding, the predetermined parameter is a voltage across any winding of the transformer; or
the predetermined parameter is a current flowing through a voltage detection pin of the control circuit.

12. The flyback converter according to claim 1, wherein the flyback converter further comprises:
a startup module for starting the control circuit when the input voltage is detected to be higher than a predetermined operating voltage threshold.

13. The flyback converter according to claim 12, wherein the startup module comprises:
a third resistor connected in parallel with the first capacitor;
a comparison unit configured to compare the input voltage with a predetermined operating voltage threshold and to activate the control circuit in a case that the input voltage is greater than the predetermined operating voltage threshold.

14. A power supply system, comprising:
a rectifier circuit for rectifying an input voltage from an AC power supply;
a power factor correction circuit being electrically coupled with the rectifier circuit for correcting a power factor of an output voltage of the rectifier circuit; and
a flyback converter according to claim 1, which outputs a predetermined DC voltage in accordance with the output voltage of the power factor correction circuit.

* * * * *